(12) United States Patent
Voigt et al.

(10) Patent No.: US 12,468,164 B2
(45) Date of Patent: Nov. 11, 2025

(54) NOSE PAD EYE/GAZE TRACKING MODULE APPLICABLE TO SMART GLASSES

(71) Applicant: VIEWPOINTSYSTEM GMBH, Vienna (AT)

(72) Inventors: Johannes Voigt, Feldkirch (AT); Frank Linsenmaier, Weinstadt (DE); Nils Berger, Schaan (LI)

(73) Assignee: VIEWPOINTSYSTEM GMBH, Vienna (AT)

(*) Notice: Subject to any disclaimer, the term of this patent is extended or adjusted under 35 U.S.C. 154(b) by 152 days.

(21) Appl. No.: 18/690,851

(22) PCT Filed: Sep. 9, 2021

(86) PCT No.: PCT/EP2021/074787
§ 371 (c)(1),
(2) Date: Mar. 11, 2024

(87) PCT Pub. No.: WO2023/036414
PCT Pub. Date: Mar. 16, 2023

(65) Prior Publication Data
US 2024/0406533 A1 Dec. 5, 2024

(51) Int. Cl.
*G02B 27/01* (2006.01)
*G02C 5/12* (2006.01)
*H04N 23/57* (2023.01)

(52) U.S. Cl.
CPC ..... *G02B 27/0179* (2013.01); *G02B 27/0172* (2013.01); *G02B 27/0176* (2013.01);
(Continued)

(58) Field of Classification Search
CPC ........... G02B 27/0179; G02B 27/0172; G02B 27/0093; G02B 27/017; G02B 27/0176; G02C 5/12; G02C 5/126; H04N 23/57
See application file for complete search history.

(56) References Cited

U.S. PATENT DOCUMENTS 6,113,237 A 9/2000 Ober et al.
2012/0127572 A1* 5/2012 Takahashi ............ H04N 13/341
359/464

(Continued)

FOREIGN PATENT DOCUMENTS

CN 109298533 A 2/2019
JP 2019195591 A 11/2019
(Continued)

OTHER PUBLICATIONS

International Search Report and Written Opinion in International Application No. PCT/EP2021/074787, mailed May 20, 2022, 14 pages.
(Continued)

*Primary Examiner* — Neil R Mikeska
(74) *Attorney, Agent, or Firm* — Liang & Hennessey LLP; Brian Hennessey

(57) ABSTRACT

The present invention relates to a nose pad eye/gaze tracking module applicable to known augmented/virtual reality glasses, to visual remote guidance devices in general or to working/safety glasses, constituting the nose pads part of said devices. The invention further provides a method for fastening the nose pad eye/gaze tracking module to said kind of devices.

15 Claims, 6 Drawing Sheets

(52) U.S. Cl.
CPC ............... *G02C 5/12* (2013.01); *G02C 5/126* (2013.01); *H04N 23/57* (2023.01); *G02B 2027/0178* (2013.01); *G02B 2027/0187* (2013.01)

(56) References Cited

U.S. PATENT DOCUMENTS

| | | | | |
|---|---|---|---|---|
| 2015/0077697 | A1* | 3/2015 | Gottardi | G02C 11/10 351/159.01 |
| 2017/0227786 | A1* | 8/2017 | McGinley | G02C 1/06 |
| 2021/0345706 | A1* | 11/2021 | Kaltenbach | A41D 13/1161 |
| 2024/0056671 | A1* | 2/2024 | Voigt | G06T 7/70 |

FOREIGN PATENT DOCUMENTS

| | | |
|---|---|---|
| WO | 2007016739 A1 | 2/2007 |
| WO | 2008045137 A1 | 4/2008 |
| WO | 2021164867 A1 | 8/2021 |
| WO | 2022135660 A1 | 6/2022 |

OTHER PUBLICATIONS

ViewPointsystem: "ViewPointsystem Modules," Nov. 10, 2021.
ViewPointsystem: "Digital Iris Inside The ESM 22 Eye Sensor Module," Nov. 10, 2021.

\* cited by examiner

NOSE PAD EYE/GAZE TRACKING MODULE APPLICABLE TO SMART GLASSES

CROSS-REFERENCE TO RELATED APPLICATIONS

The present application is a national phase application of PCT Application No. PCT/EP2021/074787, filed Sep. 9, 2021, entitled "NOSE PAD EYE/GAZE TRACKING MODULE APPLICABLE TO SMART GLASSES", which is incorporated by reference in its entirety.

BACKGROUND OF THE INVENTION

1. Field of the Invention

The present invention discloses a nose pad eye/gaze tracking module applicable to smartglasses implementing extended reality technology (augmented/virtual/mixed reality AR, VR, MR), to visual remote guidance devices or to safety/working eye glasses in general. The invention further deals with a method for fastening the module to said smart/safety/working eye glasses (also referred to as smart eye glasses herein) and with an eye/gaze tracking device (also referred to as a gaze tracking device herein) comprising smart/safety/working eye glasses provided with the eye tracking module.

2. Description of the Related Art

Eye-tracking devices and in particular spectacles usually comprise a camera, which is oriented onto an eye of the spectacles wearer; such camera is able to detect the pupil of the user in order to ascertain the coordinates of the pupil in the space. Gaze tracking devices further comprise a front camera able to capture the scenario in front of the user. In this case the device is able to determine the viewing direction of the user eyes, which can be displayed on a correspondent display computer device to a second user remotely connected via internet live streaming.

US2016/0206196 discloses gaze-tracking spectacles comprising two eye cameras arranged in the nose frame of the glasses and a field of view camera in the middle of the glasses, showing the front scenery of the user.

The field of view camera is provided to record a field of view, video including individual and successive field of view images. The recordings of the two eye acquisition cameras and the at least one field of view camera can thus be entered in correlation in the field of view video of the respective gaze point.

Unfortunately this prior art document discloses eye tracking glasses having a frame similar to normal pair of glasses.

Furthermore are known augmented/virtual/mixed reality glasses, provided with a very minimal spectacles frame, including an horizontal upper part provided with an element constituting the nose frame, in order to have the device placed stably and supported by the nose of the user.

SUMMARY OF THE INVENTION

One objective of the present invention, according to a first of its aspects, is obtaining an eye/gaze tracking module, being a finished product, ready to be used once mechanically fastened to the smart glasses, like augmented or virtual or mixed reality glasses, or to visual remote guidance devices in general, or like safety glasses, specific work glasses, technical glasses.

A second objective of the present invention is giving the possibility to make augmented or virtual or mixed reality glasses able to be customized and to fit immediately to different somatic features typical of different ethnic groups like for instance Asian people, European people, avoiding the necessity to create different and specific smart glasses models.

A third objective of the present invention is giving the possibility to the user to easily fasten and unfasten an eye/gaze tracking module to/from his/her own smart/safety/working eye glasses.

A fourth objective of the present invention is to provide an eye/gaze tracking module easily adaptable to different smart glasses frames, easy to be cleaned and at the same time firmly attachable to said smart glasses.

A further objective of the present invention is to provide an eye/gaze tracking module able to not interfere with the user's nose, being not in contact with it and/or with the user's field of view, once fastened to the smart glasses.

A further objective of the present invention is to provide an eye/gaze tracking module that is very light weight, compact and characterized by reduced dimensions and comfortable for the user.

Another objective of the present invention is to provide an eye/gaze tracking device reliable, easy to be used by the user, with a reduced cost in respect to known eye tracking devices.

Another objective of the present invention is to provide a fastening method easy to be implemented by user.

Hereinafter are summarized some technical aspects of the present inventions which enable some of the most important purposes to be achieved.

According to a first aspect this invention relates to an eye/gaze tracking module configured to be easily fastened/unfastened to/from a pair of smart spectacles or working eye glasses being not provided with any nose pads, thus creating an eye/gaze tracking device, said module comprising a first part, having a U-shaped portion, housing at least one left eye sensor and one right eye sensor to detect pupil positions of the user in a plurality of images, said module further comprising a second part, housing a mechanical interface configured to connect the module to the smart/working spectacles, said module further comprising electronic components namely at least a data processing unit, a memory, a data interface, enclosed in the first part frame or in the second part frame, said electronic component configured to connect the module to a computer device remotely connected or to other devices in general, and to send to said computer device eye movement information of the user wearing the spectacles to which is fastened the module.

Such module provides a pair of smartglasses provided with extended technology like AR/VR/MR technology or safety/working glasses, being not provided with any nose pads, with an eye/gaze tracking device, thus providing a compact and very small eye/gaze tracking module arranged to form the nose pads of the spectacles to which the module is fastened.

According to a second aspect this invention relates to a module wherein the mechanical interface extends facing inwardly from the second part frame of the module and is configured to easily and stably fasten itself to a correspondent mechanical interface facing outwardly, provided at the central portion of the smart/safety/working eye glasses.

In this case the connection from the outside the smart/safety/working eye glasses, does not have any impact on the reduced available space between the smart/safety/working eye glasses and head of the human being.

According to a third aspect this invention relates to a module wherein the module further comprises a U-shaped portion having a C shaped section, with the concavity upwards faced. The concavity of the C-shaped section is actually the connecting surface between the nosepad eye/gaze tracking module and the corresponding mechanical interface arranged downwards at vertical correspondence of the central portion of the smart/safety/working eye glasses.

In this case the bottom-up connection between the module and the smart/safety/working eye glasses at the central portion, implies a very reduced space occupied by the module when in use.

According to a fourth aspect this invention relates to a module wherein the two arms of the U-shaped area are provided with one extension per each arm extending towards the visors area, in a correspondent cut out of the visor. In each one extension is arranged the corresponding eye sensor, each one per side and may be arranged also the corresponding illuminators each one per side.

In this case the extension has also the purpose of improving the stability of connection between the nose pad eye/gaze tracking module and the safety/working eye glasses, acting as further engagement points between the two devices.

According to a fifth aspect this invention relates to nose pad eye tracking module configured to be easily fastened/unfastened from the smart/safety/working eye glasses.

According to a sixth aspect this invention relates to a method for fastening the node pad eye tracking module to a smart/safety/working eye glasses, wherein the eye glasses has at least a mechanical interface at a central portion of an upper frame.

According to further aspects this invention relates to further module, product and method features claimed in the dependent claims of the present specification.

BRIEF DESCRIPTION OF THE DRAWINGS

The structural and functional features of the present invention and its advantages with respect to the known prior art, will become even clearer from the underlying claims, and in particular from an examination of the following description, made with reference to the attached figures which show a preferred but not limited schematic embodiment of the invented method, system, device, in which:

DETAILED DESCRIPTION

In general, this disclosure describes a nose pad eye/gaze tracking module 1, a method for fastening/unfastening the module to/from different kind of smart/safety/working eye glasses 8, and an eye/gaze tracking device comprising smart/safety/working eye glasses 8 provided with the nose pad eye tracking module 1.

The specifications "right" or "left" or "high" or "low" or "front" or "back" relate to the intended manner of wearing eye glasses and the eye tracking module by a human being.

Regarding smart/safety/working eye glasses 8 in general, it shall be highlighted that they have at least an upper part of their frame having the purpose to hold the temples and if necessary retaining the lenses, which could be sun lenses or specific filtering/protective lenses or lenses in general. Furthermore they may have at least a portion, so called nose bridge, acting as a spacer between the two lenses, able to create the space for the user's nose.

Figure 8:
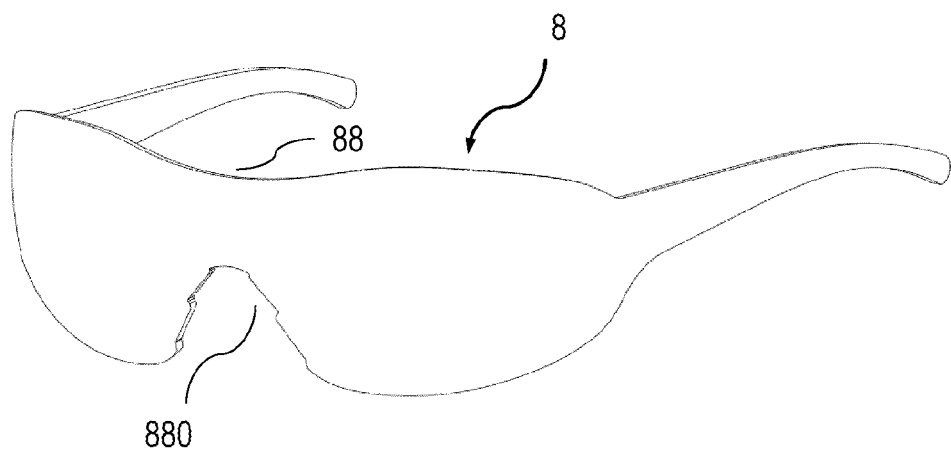
FIGS. 8 and 9 illustrate respectively a three-dimensional view of the smart/safety/working eye glasses 8 to which is connected and not connected the third embodiment of the nose pad eye/gaze tracking module 1.
Figure 9:
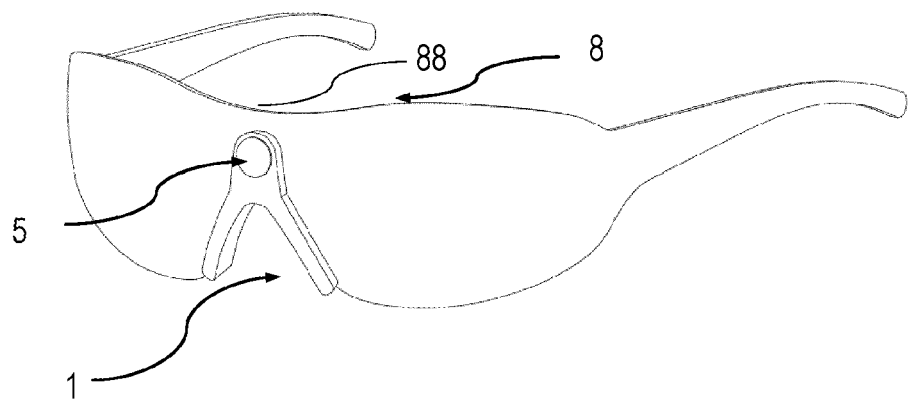
Figure 10:
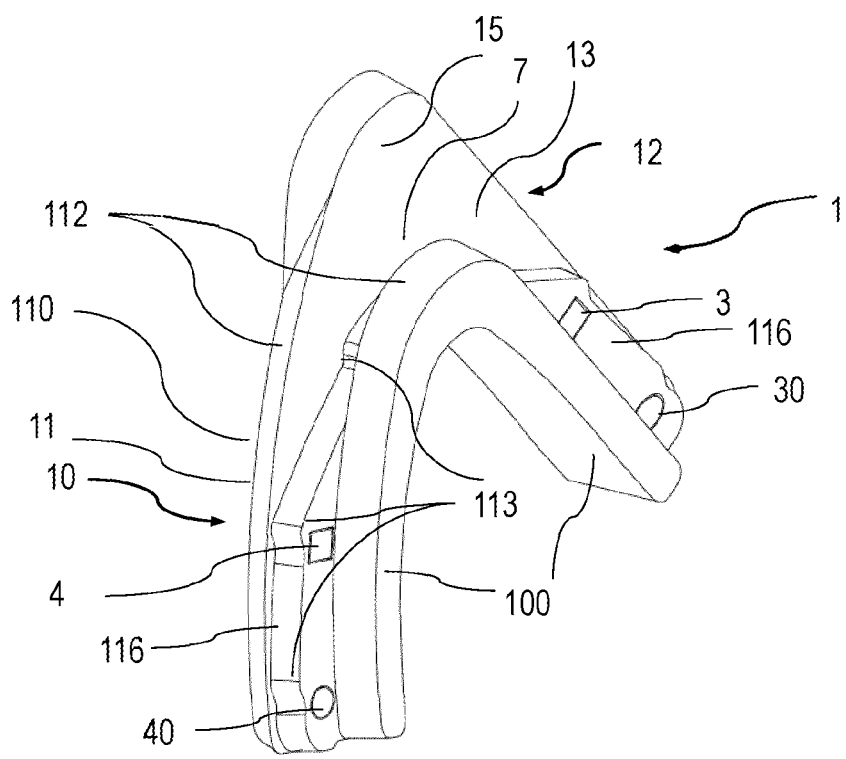
FIG. 10 illustrates three-dimensional view of a fourth preferred embodiment of the nose pad eye/gaze tracking module according to the present invention.
Figure 11:
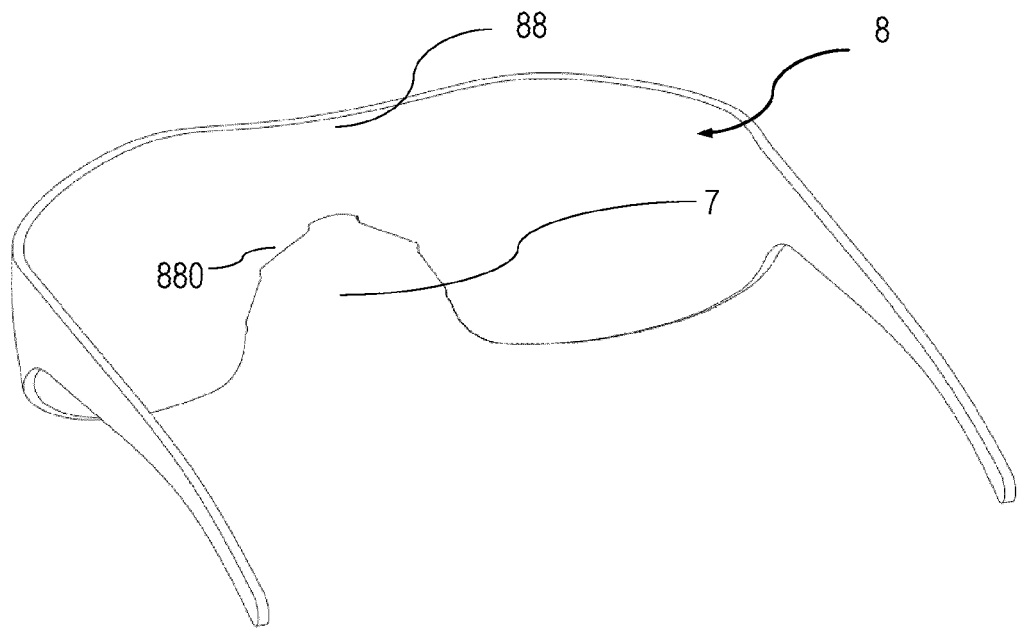
FIGS. 11 and 12 illustrate respectively a three-dimensional view of the smart/safety/working eye glasses 8 to which is connected and not connected the fourth embodiment of the nose pad eye/gaze tracking module 1.

The nose bridge is a portion necessary in all eye glasses, but in some cases this portion is not clearly detectable, like for example in the ones configured like safety goggles, where a visor replaces the lenses. In some cases, like smart glasses provided with extended technology (see FIG. 2), the central portion 88 of the upper frame of the smart glasses, may be a suitable frame portion or may provide a specific mechanical interface where the eye tracking module of the present invention may be fastened. In other cases like safety eye glasses, is present a visor having a concave shape where the user's nose could find place (see for instance FIG. 8, 11).

The nose pad eye tracking module 1, according to the present invention, comprises a first part 10, comprising a first part frame 11, having in turn a U-shaped portion 110. In said U-shaped portion 110 are preferably located a right eye acquisition sensor 4 and a left eye acquisition sensor 3, which have the purpose of taking images of each user's eye, in order the position of the pupil in the space be detected (see FIGS. 1, 4, 7, 10).

The left and right eye sensors 3, 4 may be preferably eye cameras, but may be different kind of technologies like lasers able to scan user's eyes to detect position of pupils or micro electromechanical systems like for instance MEMS-based scanning elements.

Figure 1:
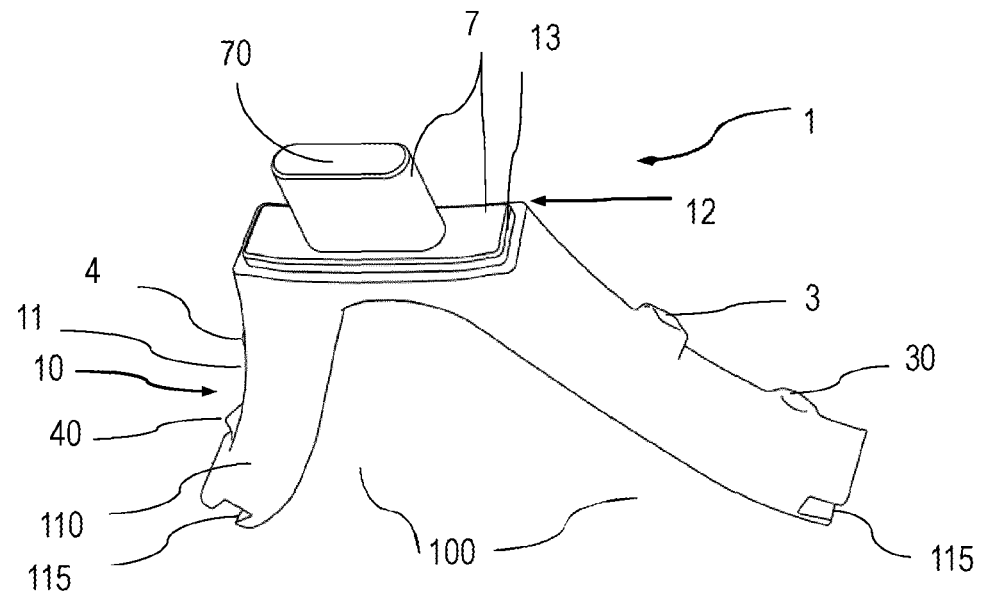
FIG. 1 illustrates three-dimensional view of a first preferred embodiment of the nose pad eye/gaze tracking module according to the present invention.

The module furthermore comprises a second part 12, having a second part frame 13, housing—in a preferred embodiment-a mechanical interface 7 (see FIG. 1). Said mechanical interface 7 is configured to easily and stably fasten itself to a correspondent mechanical interface provided in the central portion.

Said mechanical interface 7 in all the embodiments described in the present specification may be provided also with electrical/electronic interface (not shown in the drawings), in order to electrically/electronically connect the nose pad eye/gaze tracking module 1 with the smart/safety/working eye glasses 8.

Figure 2:
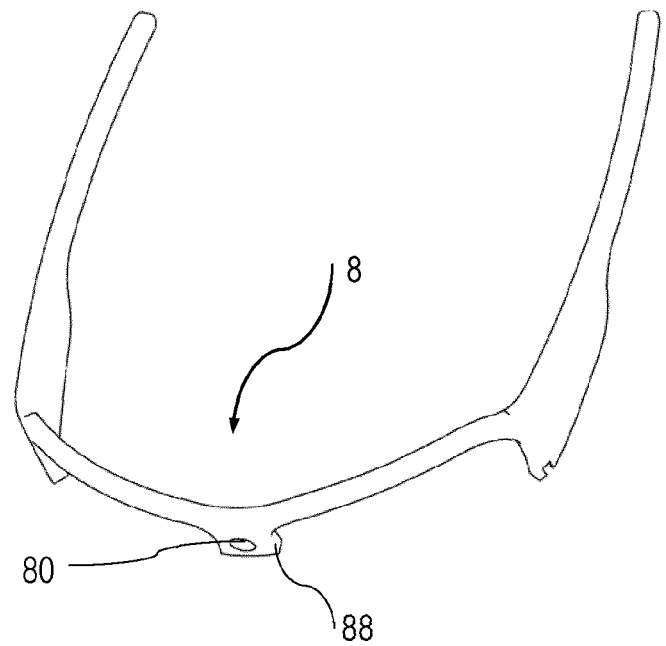
FIGS. 2 and 3 illustrate respectively a three-dimensional view of the smart/safety/working eye glasses 8 to which is connected and not connected the first embodiment of the nose pad eye/gaze tracking module 1.
Figure 3:
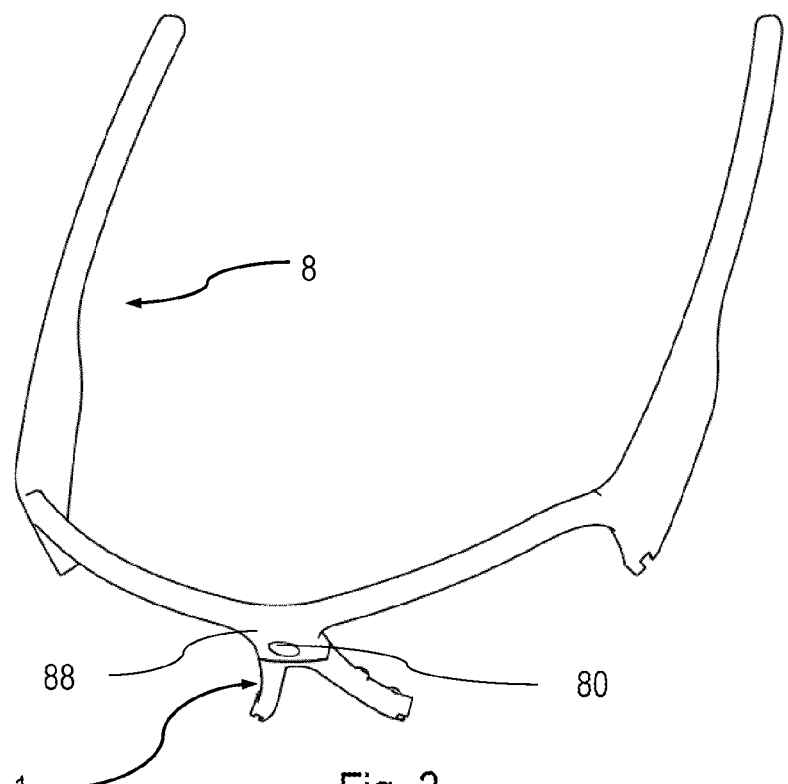
Figure 4:
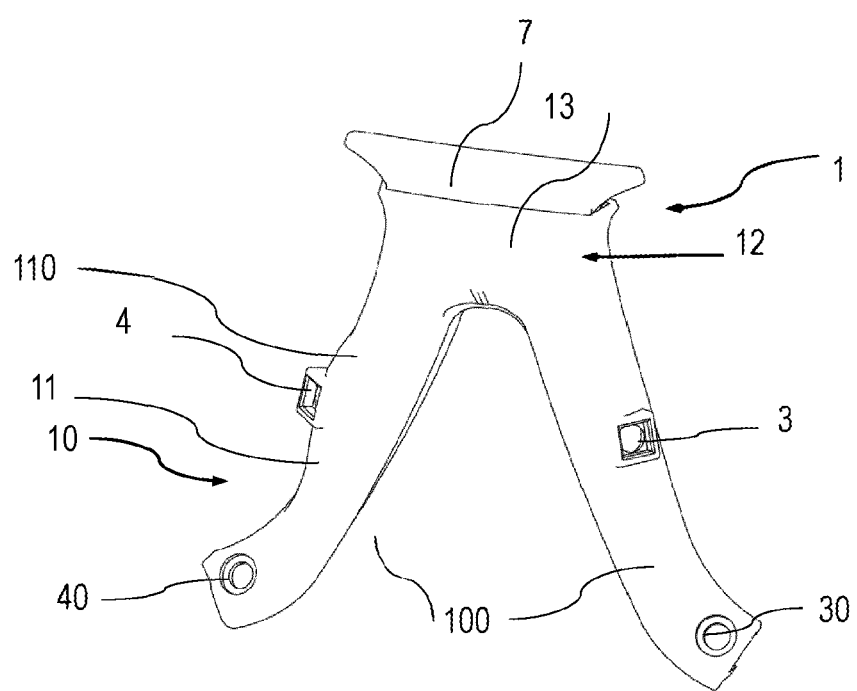
FIG. 4 illustrates three-dimensional view of a second preferred embodiment of the nose pad eye/gaze tracking module according to the present invention.

In a preferred embodiment the mechanical interface 7 on the second part frame 13, is the combined action of the connection between the specific upward section shape of that second part frame 13 (rectangular in FIG. 1) and a corresponding downward section shape (not visible in the drawings) of the central portion 88 of the smart/safety/working eye glasses 8, and/or in addition the plug 70 connection to a correspondent socket (not visible in the drawings) on the central portion 88 of the smart/safety/working eye glasses 8 (see FIGS. 1 to 3). It's important to point out that the mentioned downward section shape may be also designed as an element extending down from the central portion 88 of the smart/safety/working eye glasses 8.

The plug and socket connection may be of the USB type of other known suitable type of plug-socket connection. In this case exploiting plug-socket connection will include the signal/electrical connection between the nose pad eye/gaze tracking module 1 and the smart/safety/working eye glasses 8.

Furthermore, it is important to highlight that the bottom-up connection between the module 1 and the smart/safety/working eye glasses 8 at the central portion 88, implies a very reduced space occupied by the module 1, because available space is very small between the smart/safety/working eye glasses 8 and head of the human being, when between the smart/safety/working eye glasses 8 and the nose pad eye/gaze tracking module 1 are connected together and in use.

The U-shaped portion 110 comprises two arms 100, being particularly designed for being used as nose pads, thus being configured to make the smart/safety/working eye glasses 8 easily customizable on different nose shapes when the module is fastened to said smart/safety/working eye glasses. The nose pad eye/gaze tracking module 1 of the present invention is used, replacing, the nose pads of the smart/safety/working eye glasses 8, without interfering with the user's nose.

The U-shaped part 110 may be made by soft materials, and in particular the arms 100 may be made with flexible material, in order to further better adapt the arm 100 shapes to the nose of the user and to cooperate fastening the module on the smart/safety/working eye glasses 8 as described hereinafter.

Due to the integration of the eye acquisition sensors 3, 4 in the U-shaped part 110, the eye tracking module, do not have any protruding parts, and is therefore suitable to be worn as module attachable to work spectacles or protective spectacles. The viewing movements of a worker or of a human operating a machine can thus not only be monitored and analysed, but rather can be used directly for controlling the machine, if said eye tracking module is operatively connected to said machine. In addition, the capability for controlling a machine can thus be monitored, since the physical and mental state of the relevant human can be concluded on the basis of the eye movements, for example, whether he is overtired or under the influence of psychotropic substances. Thus, above all in the case of public use of the eye tracking module, significantly improved results can be achieved, because the measurement accuracy is increased, and also the measurement apparatus can now no longer be perceived by the surroundings and therefore also does not result in negative influences of the test person.

As mentioned before, in a preferred solution, the right eye acquisition sensor 4 is arranged in the right arm 100, and the left eye acquisition sensor 3 is arranged in the left arm 100 of the U-shaped portion 110. When the two eye acquisition sensors 3, 4 are designed as digital cameras they may have an objective lens. The two eye acquisition cameras 3, 4 are each provided to prepare an eye video including individual eye images or individual images of eyes of the human wearing the eye tracking module. Said eye acquisition cameras 3, 4 must be directed towards the position of the eyeball of the wearer.

The arms 100 may be provided with specific ends 115, able to mechanically connect to other portion of the frame of the smart/safety/working eye glasses 8.

In the embodiment shown in FIG. 1, 2, 3 the recording of the two eye acquisition sensors 3, 4 can enter in correlation with the recording of a field of view camera 80 already present on the central portion 88 of the smart/safety/working eye glasses 8, providing the respective gaze point of the user in the field of view video (when the module is fastened to the smart/safety/working eye glasses 8).

It may be provided that at least one field of view camera 5 is arranged on a third part 14 of the module 1, in each embodiment disclosed in the present specification. The field of view camera 5 is provided to record a field of view video, including individual and successive field of view images. In that case the recordings of the two eye acquisition sensors 3, 4 and the at least one field of view camera 5 can thus be entered in correlation in the field of view video of the respective gaze point of the user (when the module is fastened to the smart/safety/working eye glasses), in case the module include also the third part 14.

More than one field of view cameras may also be arranged in the third part 14 of the nose pad eye tracking module, in each embodiment disclosed in the present specification.

Furthermore the module has electronic components like a data processing unit (like a microprocessor), a connected storage medium and a data interface, the data processing unit being connected to the right eye acquisition sensor 4 and the left eye acquisition sensor 3. The module furthermore may have an energy accumulator for the energy supply of the eye sensors 3, 4, and also the data processing unit, memory and the data interface. The module furthermore may have an external power supply via cable, or an internal battery and a correspondent power interface, not shown in the schematic drawings.

In each embodiment disclosed in the present specification the electronic components, including a data processing unit (like a microprocessor) and a connected storage medium, may be arranged in the first part 10, or in the second part 12 or some of them in the first part 10 and other ones in the second part 12.

In each embodiment disclosed in the present specification, the third part 14 encloses all the electronic components, like at least a data processing unit, a memory, a data interface, a power unit/interface, in order to give protection to said electronic components and to avoid possible module hot parts being in contact with nose or face of the user. Furthermore because of these electronic components are enclosed inside the relevant module frames and the module frame shapes being sealed and having no sharp edges, the module disclosed in the present invention is also easy to be cleaned. Furthermore the frame of each part where these electronic parts are arranged, encloses them, conferring them protection against accidentals hits, dust or in general external agents which might compromise said part operations (the drawings provided are schematic and do not have limiting purposes).

In each embodiment disclosed in the present specification a data processing unit may be preferably designed as a combination of a microcontroller or processor together with a memory. The data processing unit is connected in a signal-conducting manner to a data interface. It can also be provided that the data interface and the data processing unit are formed jointly in hardware, for example, by an ASIC or an FPGA. The interface is preferably designed as a wireless interface, for example, according to the Bluetooth standard or IEEE 802.x, or as a wired interface, for example, according to the USB standard, wherein in this case the eye tracking module has a corresponding socket, for example, according to micro-USB or USB Type C. Additional sensors might be inserted in the eye tracking module and connected to the data processing unit.

In each embodiment disclosed in the present specification the data processing unit, the memory and the data interface may be connected at least indirectly to an energy accumulator by circuitry, and are connected in a signal-conducting manner to the field of view camera 5 (when present), the right eye acquisition sensor 4, and the left eye acquisition sensor 3.

It shall be highlighted that in each embodiment disclosed in the present specification, the entire recording, initial analysis, and storage of the recorded videos can thus be performed in or by the eye tracking module itself or by a computer device connected (wireless or via cable) to the module.

Regarding the U-shaped portion 110 where are arranged at least one left eye sensor 3 and one right eye sensor 4, in each embodiment disclosed in the present specification also a left Infrared LED illuminator 30 and a right Infrared LED illuminator 40 may be arranged in said U-shaped portion 110. Said illuminators 30, 40 help to better detect pupil positions of the wearer's eyes, when in use.

As already described, when the module comprises a field of view camera 5, it is able to detect a plurality of images, as video images, of the field of view of the wearer the nose pad eye tracking module, once fastened when in use. Said field of view camera 5 may be arranged in the third part frame 15 facing outwardly the smart/safety/working eye glasses 8 when in use, or may be arranged in a portion of the third part frame 15, which may be configured to be higher than the upper portion of the frame of the smart/safety/working eye glasses 8 when the eye tracking module is fastened to the smart/safety/working eye glasses 8 (see FIG. 7, 9).

In another preferred solution (see FIG. 7, 8, 9) the arms 100 of the U-shaped portion 110 has a C shaped section, with the concavity upwards faced. The concavity of the C-shaped section is actually the connecting surface 111 between the nosepad eye/gaze tracking module 1 and the corresponding mechanical interface 880, being arranged downwards, arising from the central portion 88 of the smart/safety/working eye glasses 8.

In this case the mechanical interface 7 is arranged on the first part 10 of the nose pad eye/gaze tracking module 1.

This embodiment particularly suits safety/working eye glasses 8 having a visor provided with an U-shaped area for arranging nose pads. In this case the downwards faced profile of the U-shaped area is the mechanical interface 880, which fits the correspondent connecting surface 111 between the two ribs 112. Said two ribs 112 hold the nosepad eye/gaze tracking module 1 firmly in place on the lower profile of U shaped area of the visor, being the width of connecting surface 111 equal to that of the downwards faced profile of the U-shaped area.

In this embodiment the eye sensors 3, 4 and the illuminators 30, 40 are placed facing inward the safety/working eye glasses 8, in order to be able to detect properly user's eye when in use.

Figure 7:
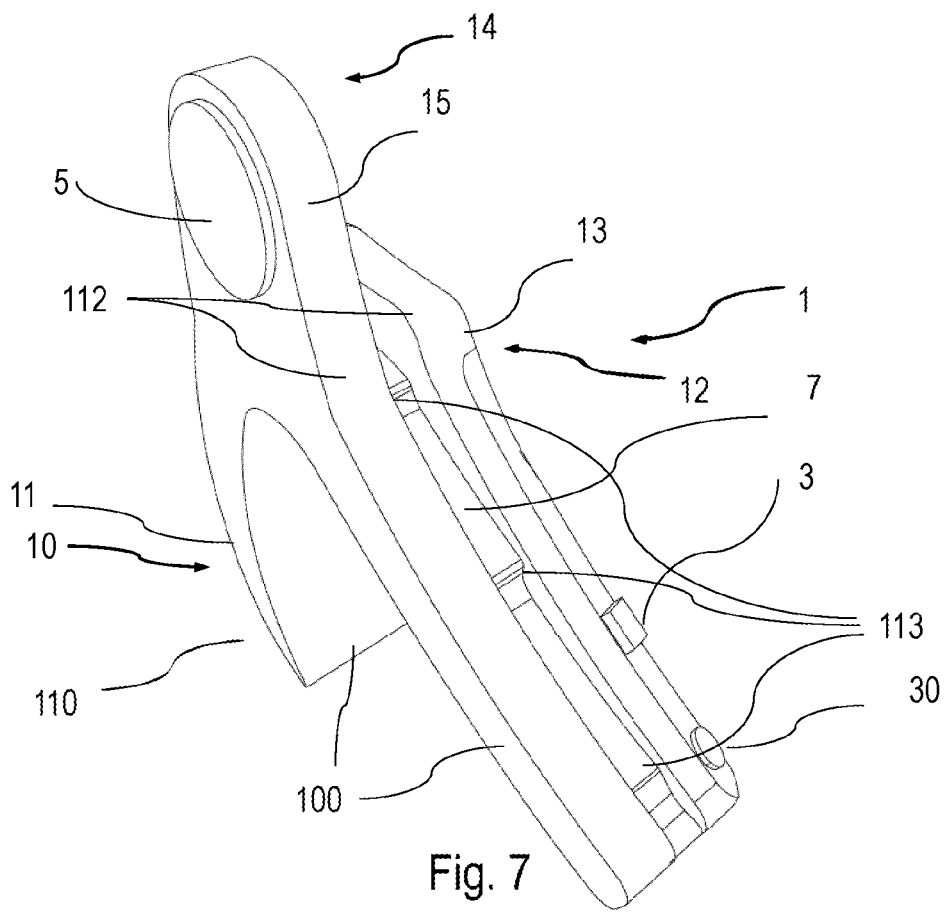
FIG. 7 illustrates three-dimensional view of a third preferred embodiment of the nose pad eye/gaze tracking module according to the present invention.

The connecting surface 111 may be provided with at least one or more than one engagement point 113 per side, therefore one on the left arm 100 and one on the right arm 100 (see FIG. 7). Said engagement points 113 are configured to fit corresponding recesses zones of the mechanical interface 880 on the lower profile of U shaped area of the visor, in order to improve the stability of the connection between the nose pad eye/gaze tracking module 1 and the safety/working eye glasses 8.

In order to determine continuously the user's gaze direction over his field of view, when he/she wears the safety/working eye glasses 8, the nose pad eye/gaze tracking module 1, in any embodiment described in the present invention, may further comprise a third part 14, having a third part frame 15, comprising at least a field of view camera 5, configured to detect in a plurality of images the field of view of the user, when in use. Once the images from the eye sensors 3, 4 and field of view camera 5 are processed by the electronic components of the nose pad eye/gaze tracking module 1, the gaze information are in general represented—to the remotely connected device—by visual points on related visual representations of the field of view of the user.

In a further preferred solution the connecting surface 111 may is not provided with any engagement point 113. In this case the stability of connection between the nose pad eye/gaze tracking module 1 and the safety/working eye glasses 8 is reached by constrain forces acting on the lower profile of U shaped area of the visor and the two ribs 112 by the curvature of the visor on the horizontal plane of the safety/working eye glasses 8. In this case the mechanical interface 7 is the connecting surface 111, therefore the mechanical interface is arranged on the first part 10 of the nose pad eye/gaze tracking module 1.

In a further preferred solution (see FIG. 10, 11, 12) the two arms 100 are provided with one extension 116 per each arm 100, said extension 116 extending towards the visors area, i.e. in the opposite direction to the U shaped area of the visor, and being arranged in a correspondent cut out of the visor. In each one extension 116 is arranged the corresponding eye sensors 3, 4 each one per side and may be arranged also the corresponding illuminators 30, 40 each one per side.

In this case the extension 116 has also the purpose of improving the stability of connection between the nose pad eye/gaze tracking module 1 and the safety/working eye glasses 8, providing and acting as further engagement points between the two devices.

Figure 12:
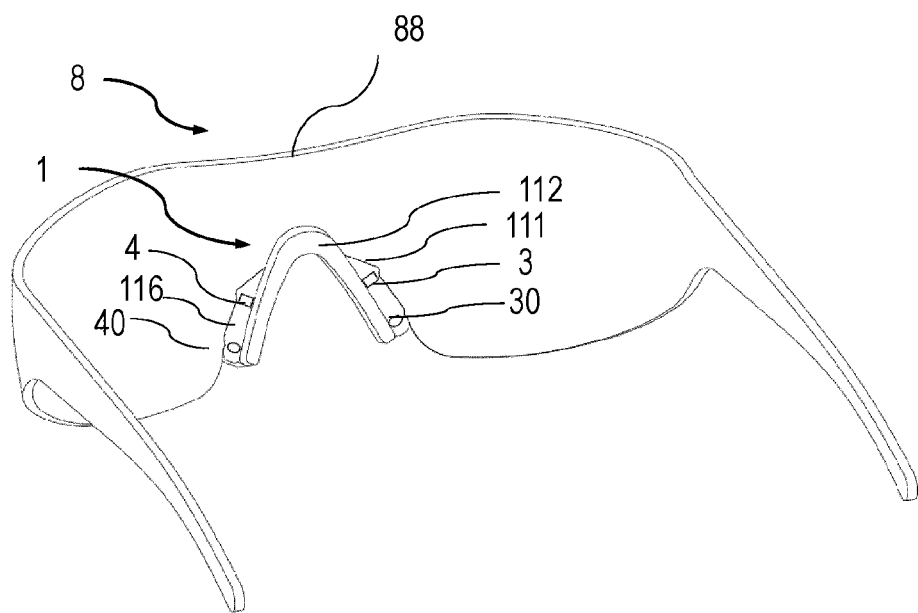

In this case the mechanical interface 7 is the connecting surface 111, therefore the mechanical interface is arranged on the first part 10 of the nose pad eye/gaze tracking module 1. The mechanical interface 7 fits stably and firmly with the corresponding mechanical interface 880 arranged downwards arising from the central portion 88 of the smart/safety/working eye glasses 8 (see FIG. 12).

It shall be highlighted that each embodiment disclosed in the present invention the two arms 100 are designed in such a way to be used as nose pads configured to make the smart/safety/working eye glasses 8 customizable on different nose shapes when the module is fastened to said smart/safety/working eye glasses 8.

Furthermore it's important to highlight that the field of view camera 5, when present in any of the embodiment disclosed in the present invention is preferably placed facing outwardly over the visor, i.e. not towards the head of the wearer, avoids to use the already reduced space between the smart/safety/working eye glasses 8 and head of the human being, resulting in a very compact design of the two devices as a whole.

In a further preferred embodiment (see FIG. 4, 5, 6) the nose pad eye/gaze tracking module 1—has the mechanical interface 7 extending facing inwardly from the second part 12, in particular from the second part frame 13. Said mechanical interface 7 is configured to easily and stably fasten itself to a corresponding mechanical interface 880 facing outwardly provided in the central portion 88 of the smart/safety/working eye glasses 8 (see FIG. 5). It's important to point out that the mentioned mechanical interface 880 may be also arranged in an element extending down from the central portion 88 of the smart/safety/working eye glasses 8.

Figure 5:
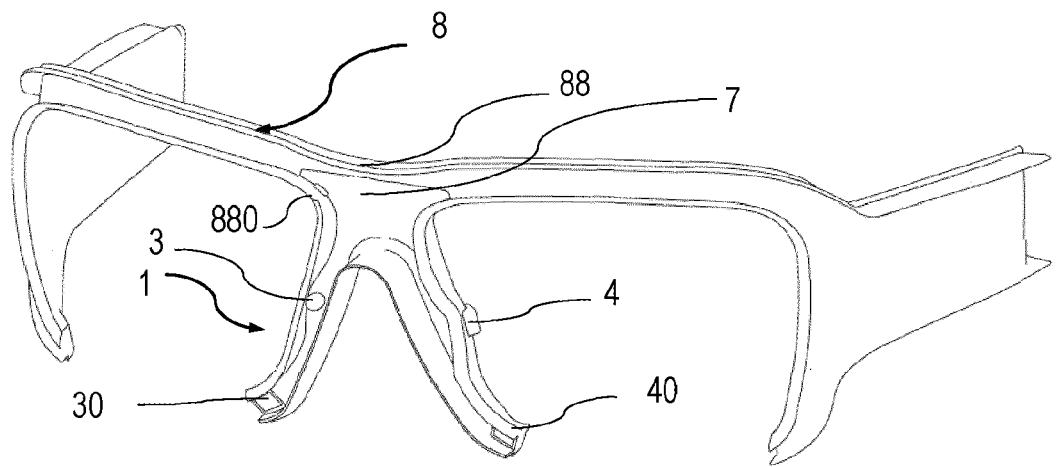
FIGS. 5 and 6 illustrate respectively a three-dimensional view of the smart/safety/working eye glasses 8 to which is connected and not connected the second embodiment of the nose pad eye/gaze tracking module 1.
Figure 6:
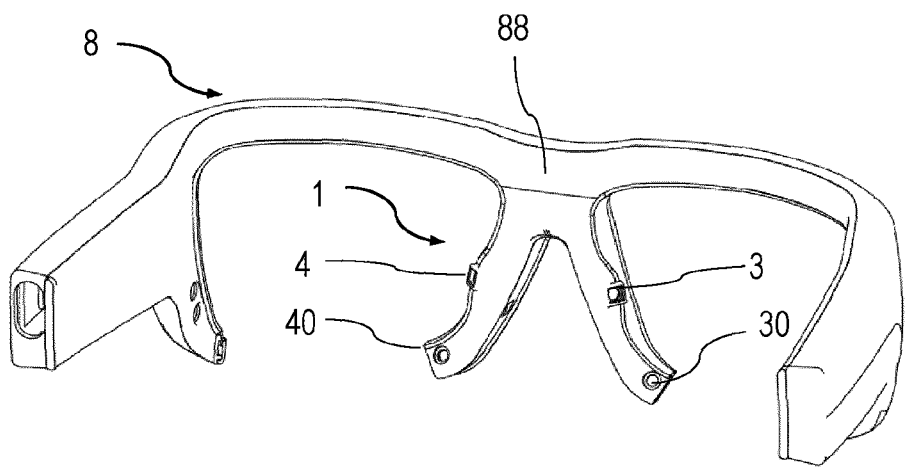

The embodiment shown in FIGS. 5 to 6 needs a further style cover to be applied over the nose pad eye/gaze tracking module 1 and smart/safety/working eye glasses 8, when they are fastened together. A different configuration, where a correspondent outer mechanical interface 880 is provided on the central portion 88 of the smart/safety/working eye glasses 8 may allow the module 1 to be easily fastened to the smart/safety/working eye glasses 8.

In this case it's important to highlight that the connection from outside smart/safety/working eye glasses 8, does not have any impact on the reduced available space between the smart/safety/working eye glasses 8 and head of the human being.

The nose pad eye/gaze tracking module 1 disclosed in the present invention, due to its dimension reduced size and to its described configuration, results in a very light weighted module, not affecting the user's comfort, when he is wearing his/her smart/safety/working eye glasses 8 to which is fastened the module.

The present invention further relates to a method for fastening the nose pad eye tracking module 1 to a smart/safety/working eye glasses 8, wherein the eye glasses 8 and module 1 have structures already described in this specification, according to all the embodiments described. The method comprises the following steps:
   bottom-up connecting the nosepad eye tracking module 1 to the smart/safety/working eye glasses 8 at the central portion 88 of the smart/safety/working eye glasses 8.

The present invention further relates to an eye/gaze tracking device comprising a pair of smart/safety/working eye glasses 8 and the nose pad eye tracking module 1, wherein the smart/safety/working eye glasses 8 and the nose pad eye/gaze tracking module 1 have structures already described in this specification, according to all the embodiments described.

The invention claimed is:

1. A nose pad gaze tracking module configured to be easily fastened to and unfastened from a pair of smart eye glasses not provided with any nose pads, thus creating a gaze tracking device, the nose pad gaze tracking module comprising:
   a first part having a first part frame having a U-shaped portion including two arms and being adaptable and compatible with a nose bone of a user when in use, said first part frame housing at least one left eye sensor and one right eye sensor, said eye sensors being arranged on the arms to detect a plurality of pupil position images of the user when in use;
   a second part having a second part frame and a mechanical interface configured to connect the module to the smart eye glasses; and
   electronic components including at least a data processing unit, a memory, and a data interface, the electronic components being configured to connect the module to a remotely connected computer device, and to send to the computer device eye movement information of the user wearing the smart glasses when the nose pad gaze tracking module is fastened to the smart glasses;
   wherein the first part comprises two arms to be used as nose pads configured to make the smart eye glasses customizable on different nose shapes when the module is fastened to the smart eye glasses.

2. The module according to claim 1, wherein the mechanical interface is arranged on the second part frame in order to allow the module be bottom-up connectable to the smart eye glasses.

3. The module according to claim 2, wherein the mechanical interface comprises a plug-socket connection.

4. The module according to claim 2, wherein the mechanical interface further comprises a connection between a specific upward section shape of that second part frame and a corresponding downward section shape of the central portion of a further extension at the central portion of the smart eye glasses.

5. The module according to claim 2, wherein the mechanical interface is arranged on the first part frame in order to allow the module be bottom-up connectable to one of a corresponding mechanical interface on a visor and a U-shaped area present in the smart eye glasses.

6. The module according to claim 5, wherein:
   arms of the U-shaped area has a C shaped section; and
   the C-shaped section is the mechanical interface and comprises a connecting surface between two ribs, said two ribs being able to hold the nosepad gaze tracking module firmly in place on the corresponding mechanical interface on the visor or the U-shaped area present in the smart eye glasses.

7. The module according to claim 6, wherein a width of the connecting surface is equal to that of a downwards faced profile of the U-shaped area and follows a lower profile of the U shaped area of the visor and its curvature.

8. The module according to any of the claim 6, wherein each of the arms is provided with one extension, extending towards the visors area, said extensions being able to be arranged in a corresponding cut out of the visor or U-shaped area present in the smart eye glasses, when the module is fastened to the smart eye glasses.

9. The module according to claim 8, wherein in each extension is arranged the corresponding eye sensor.

10. The module according to claim 5, wherein the connecting surface is provided with at least one engagement point per side, said engagement points configured to fit corresponding recesses zones on the corresponding mechanical interface on a lower profile of U shaped area of the visor, in order to improve the stability of the connection between the nose pad gaze tracking module and the smart eye glasses.

11. The module according to claim 1, wherein the eye sensors are cameras.

12. The module according to claim 1, wherein the module comprises a third part having a third part frame and housing a field of view camera.

13. The module according to claim 12, wherein the field of view camera is arranged facing outwardly over the visor of the smart eye glasses.

14. A method for fastening a nose pad gaze tracking module to a pair of smart eye glasses, wherein:
   the nose pad gaze tracking module is configured to be easily fastened to and unfastened from a pair of smart eye glasses not provided with any nose pads, thus creating a gaze tracking device;
   the nose pad gaze tracking module comprises a first part having a first part frame having a U-shaped portion including two arms and being adaptable and compatible with a nose bone of a user when in use, said first part frame housing at least one left eye sensor and one right eye sensor, said eye sensors being arranged on the arms to detect a plurality of pupil position images of the user when in use;

the module further comprises a second part having a second part frame and a mechanical interface configured to connect the module to the smart eye glasses;

the module further comprising electronic components including at least a data processing unit, a memory, and a data interface, the electronic components being configured to connect the module to a remotely connected computer device, and the electronic components being configured to send to the computer device eye movement information of the user wearing the smart glasses to which is fastened the nose pad gaze tracking module; and the two arms are configured to be used as nose pads to make the smart eye glasses customizable on different nose shapes when the module is fastened to the smart eye glasses;

the method comprising:
providing said nose pad gaze tracking module;
providing said smart eye glasses; and
bottom-up fastening and connecting the module to the smart eye glasses at a central portion of the smart eye glasses to form a unitary structure.

15. A gaze tracking device comprising:
a pair of smart eye glasses; and
a nose pad gaze tracking module;

wherein the nose pad gaze tracking module is configured to be fastened to and unfastened from the pair of smart eye glasses not provided with any nose pads, thus creating a gaze tracking device;

wherein the nose pad gaze tracking module comprises a first part, having a first part frame having a U-shaped portion including two arms, being adaptable and compatible with the nose bone of a user when in use, said first part frame housing at least one left eye sensor and one right eye sensor, said eye sensors being arranged on the arms to detect a plurality of pupil position images of the user when in use;

wherein said module further comprises a second part having a second part frame and a mechanical interface configured to connect the module to the smart eye glasses;

wherein the nose pad gaze tracking module further comprises electronic components including at least a data processing unit, a memory, and a data interface, said electronic component configured to connect the module to a remotely connected computer device, and to send to said computer device eye movement information of the user wearing the smart glasses to which is fastened the nose pad gaze tracking module; and wherein the first part comprises two arms designed in such a way to be used as nose pads configured to make the smart eye glasses customizable on different nose shapes when the module is fastened to the smart eye glasses.

* * * * *